United States Patent
Kochi et al.

(10) Patent No.: US 12,169,982 B2
(45) Date of Patent: *Dec. 17, 2024

(54) COLLATION SYSTEM

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,249

(22) Filed: Jun. 26, 2023

(65) Prior Publication Data
US 2023/0334900 A1    Oct. 19, 2023

Related U.S. Application Data

(63) Continuation of application No. 18/199,463, filed on May 19, 2023, which is a continuation of application (Continued)

(30) Foreign Application Priority Data
Sep. 19, 2017  (JP) ................. 2017-179063

(51) Int. Cl.
G06V 40/16     (2022.01)
(52) U.S. Cl.
CPC .......... G06V 40/167 (2022.01); G06V 40/171 (2022.01); G06V 40/173 (2022.01)

(58) Field of Classification Search
CPC .. G06V 40/167; G06V 40/171; G06V 40/173; G06V 40/166; G06V 40/165;
(Continued)

(56) References Cited

U.S. PATENT DOCUMENTS 11,210,496 B2 * 12/2021 Kochi ................. G06V 40/171
11,704,932 B2 *  7/2023 Kochi ................. G06V 40/167
                                                            382/118
(Continued)

FOREIGN PATENT DOCUMENTS

EP     2 555 159 A1    2/2013
JP     2006-236244 A   9/2006
(Continued)

OTHER PUBLICATIONS

US Office Communication for U.S. Appl. No. 18/199,463, mailed on Jan. 4, 2024.
(Continued)

*Primary Examiner* — Nimesh Patel

(57) ABSTRACT

A collation system of the present invention includes an imaging means for acquiring a captured image of a pre-passage side area with respect to a gate, a collation means for performing a collation process between a previously registered target and a target in the captured image, and a determination means for determining propriety of passage of the target with respect to the gate, on the basis of a result of the collation process. The collation means initiates the collation process on the basis of a condition, set to each area of the captured image, for the target located in the area.

12 Claims, 12 Drawing Sheets

Related U.S. Application Data

No. 17/524,955, filed on Nov. 12, 2021, now Pat. No. 11,704,932, which is a continuation of application No. 16/645,196, filed as application No. PCT/JP2018/029806 on Aug. 8, 2018, now Pat. No. 11,210,496.

(58) Field of Classification Search
CPC ... E05B 49/00; G06T 1/00; G06T 7/00; G06T 7/70; G06T 2207/10016; G06T 5/002; G06T 5/003; G06T 7/292; G06T 13/40; G06T 17/00; G06T 2207/30196; G06T 2207/30201; G06T 2207/30244; G06T 2219/2021; G06T 3/4038; G06T 7/0002; G06T 11/00; G06T 2207/20132; G06T 5/006; G06T 7/11; G06T 7/13; G06T 7/20; G06T 7/60; G06T 7/74; G06T 7/80; G06T 2207/10024; G06T 5/001; G06T 5/007; G06K 9/00261; G06K 9/00281; G06K 9/00295; G06K 9/00255; G06K 9/00248; G06K 9/00288; G06K 9/00892; G06K 9/00228; G06K 9/00221; G06K 9/0061; G06K 9/00617; G06K 2009/00939; G06K 9/00013; G06K 9/00597; G06K 2009/00738; G06K 2209/27; G06K 9/00302; G06K 9/46; G06K 2009/3291; G06K 2209/21; G06K 9/00087; G06K 9/00315; G06K 9/00335; G06K 9/00906; G06K 9/00355; G06K 9/209; G06K 9/42; G06K 9/4671; G06K 9/6203; G06K 9/6267; G06K 2209/01; G06K 9/0004; G06K 9/00234; G06K 9/32; H04W 4/029; H04W 4/02; H04W 4/021; H04W 12/06; H04W 12/63; H04W 4/025; H04W 52/0251; G06F 21/32; G06F 3/017; G06F 16/29; G06F 21/6245; G06F 2221/2111; G06F 11/328; G06F 21/00; G06F 2200/1636; G06F 2203/04806; G06F 3/011; G06F 3/012; G06F 3/0346; G06F 13/22; H04L 63/0861; H04L 67/18; H04L 9/3231; H04L 63/10; G06Q 20/40145; G06Q 50/01; G06Q 20/02; G06Q 20/3224; G06Q 20/389; G06Q 20/4014; G06Q 20/32; G06N 20/00; G06N 5/04

See application file for complete search history.

(56) References Cited

U.S. PATENT DOCUMENTS

| | | | | |
|---|---|---|---|---|
| 2003/0039380 | A1 | 2/2003 | Sukegawa | G06K 9/00288 382/118 |
| 2006/0204050 | A1 | 9/2006 | Takizawa | G06K 9/00912 382/115 |
| 2007/0122011 | A1* | 5/2007 | Takizawa | G07C 9/10 382/118 |
| 2011/0135166 | A1* | 6/2011 | Wechsler | G06V 40/172 382/118 |
| 2012/0140994 | A1 | 6/2012 | Yamada | |
| 2013/0279757 | A1* | 10/2013 | Kephart | G06V 20/52 382/105 |
| 2013/0301886 | A1 | 11/2013 | Koda | G06K 9/00288 382/118 |
| 2014/0015930 | A1 | 1/2014 | Sengupta | |
| 2014/0050370 | A1 | 2/2014 | Inkumsah | G06F 21/32 382/117 |
| 2015/0098634 | A1 | 4/2015 | Ohsuga | |
| 2015/0302252 | A1 | 10/2015 | Herrera | G06K 9/00281 382/117 |
| 2015/0363642 | A1* | 12/2015 | Irie | G06F 18/23211 382/103 |
| 2016/0269401 | A1 | 9/2016 | Saito | G07C 9/20 |
| 2023/0334900 | A1* | 10/2023 | Kochi | G06V 40/166 |
| 2023/0343135 | A1 | 10/2023 | Kochi et al. | |

FOREIGN PATENT DOCUMENTS

| | | | |
|---|---|---|---|
| JP | 2007-148987 | A | 6/2007 |
| JP | 2007-328572 | A | 12/2007 |
| JP | 2008-017169 | A | 1/2008 |
| JP | 2008-234578 | A | 10/2008 |
| JP | 2008-310775 | A | 12/2008 |
| JP | 2010-86403 | A | 4/2010 |
| JP | 2011-176386 | A | 9/2011 |
| JP | 2014-219703 | A | 11/2014 |
| JP | 2015-1790 | A | 1/2015 |
| JP | 2015-122062 | A | 7/2015 |
| JP | 2016-035675 | A | 3/2016 |
| JP | 2016-167164 | A | 9/2016 |
| JP | 7424469 | B2 | 1/2024 |
| WO | 2008/131201 | A1 | 10/2008 |

OTHER PUBLICATIONS

Communication issued Aug. 28, 2018, issued by the Japanese Patent Office in counterpart Japanese Patent Application No. 2017-179063.
Communication issued May 21, 2019, issued by the Japanese Patent Office in counterpart Japanese Patent Application No. 2017-179063.
Communication issued Feb. 12, 2019, issued by the Japanese Patent Office in counterpart Japanese Patent Application No. 2017-179063.
Search Report issued Nov. 13, 2018, issued by the International Searching Authority in counterpart International patent Application No. PCT/JP2018/029806 (PCT/ISA/210).
Written Opinion issued Nov. 13, 2018, issued by the International Searching Authority in counterpart International patent Application No. PCT/JP2018/029806 (PCT/ISA/237).
Invitation to Respond to Written Opinion dated Aug. 14, 2020 from the Intellectual Property Office of Singapore in Application No. 11202001579V.
Notice of Reasons for Refusal dated Aug. 19, 2020 from the Japanese Office in Application No. 2019-108783.
Communication issued Oct. 9, 2020, from the European Patent Office in counterpart application No. 18859346.1.
Japanese Office Action for JP Application No. 2019-108783 mailed on Aug. 17, 2021 with English Translation.
Japanese Office Action for JP Application No. 2021-145516 mailed on Sep. 27, 2022 with English Translation.
US Office Action for U.S. Appl. No. 18/214,920, mailed on Apr. 9, 2024.
Japanese Office Action for JP Application No. 2023-096173 mailed on Mar. 26, 2024 with English Translation.

\* cited by examiner

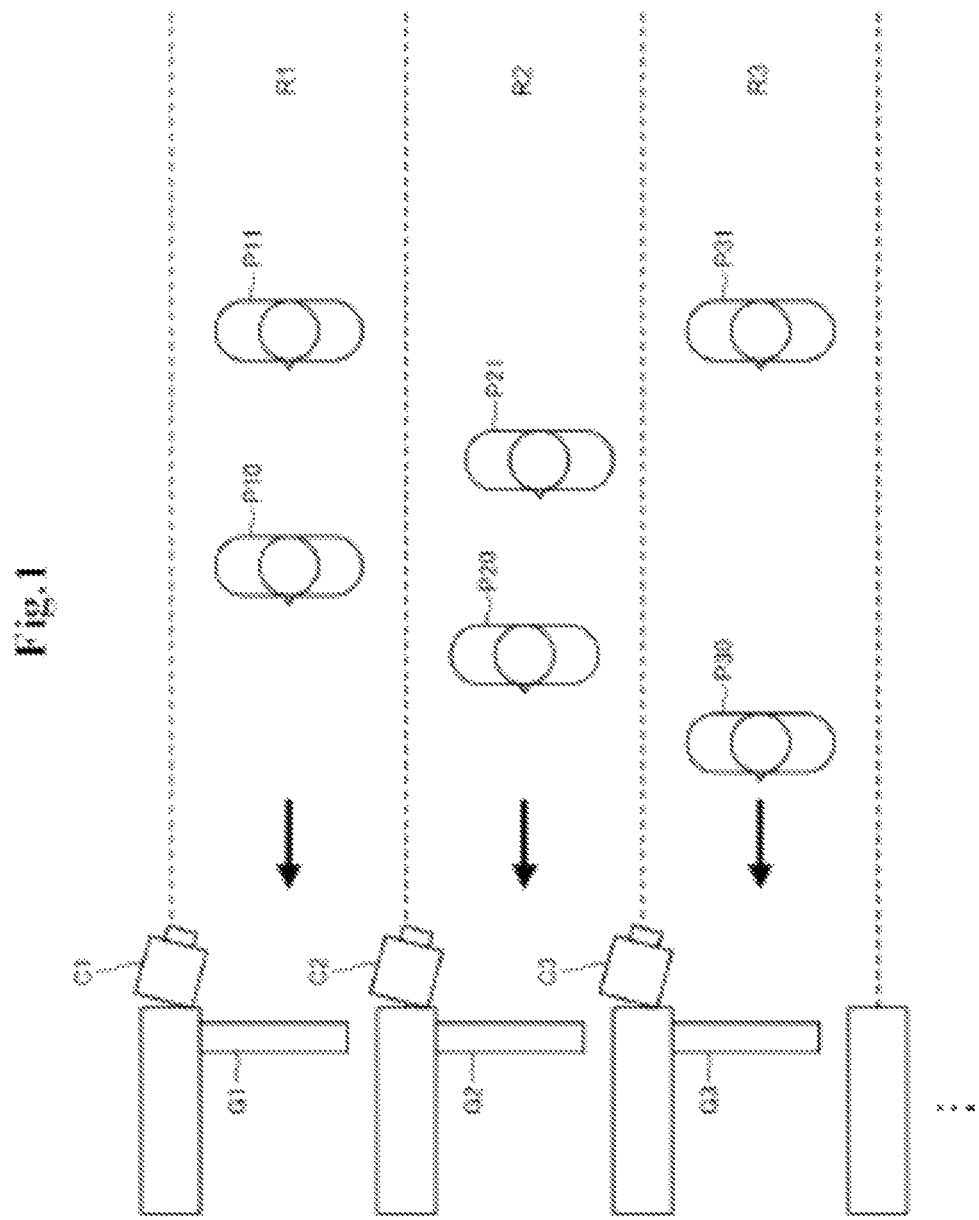

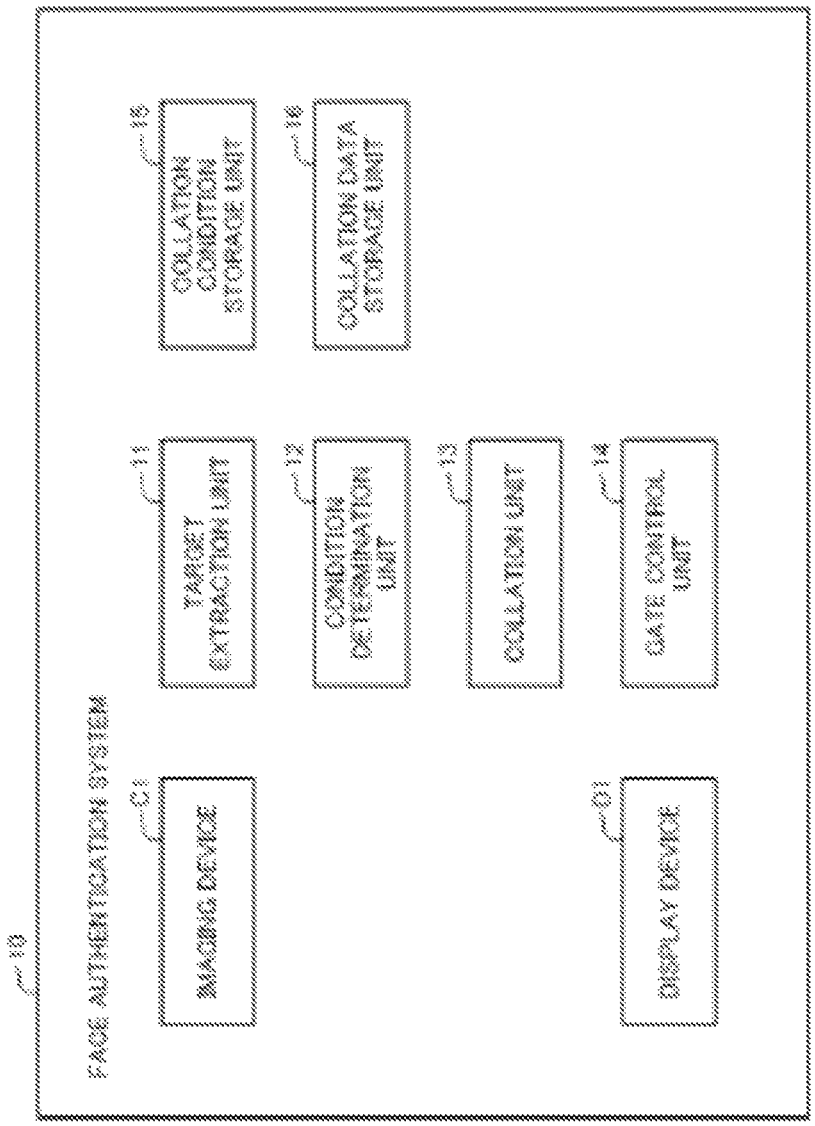

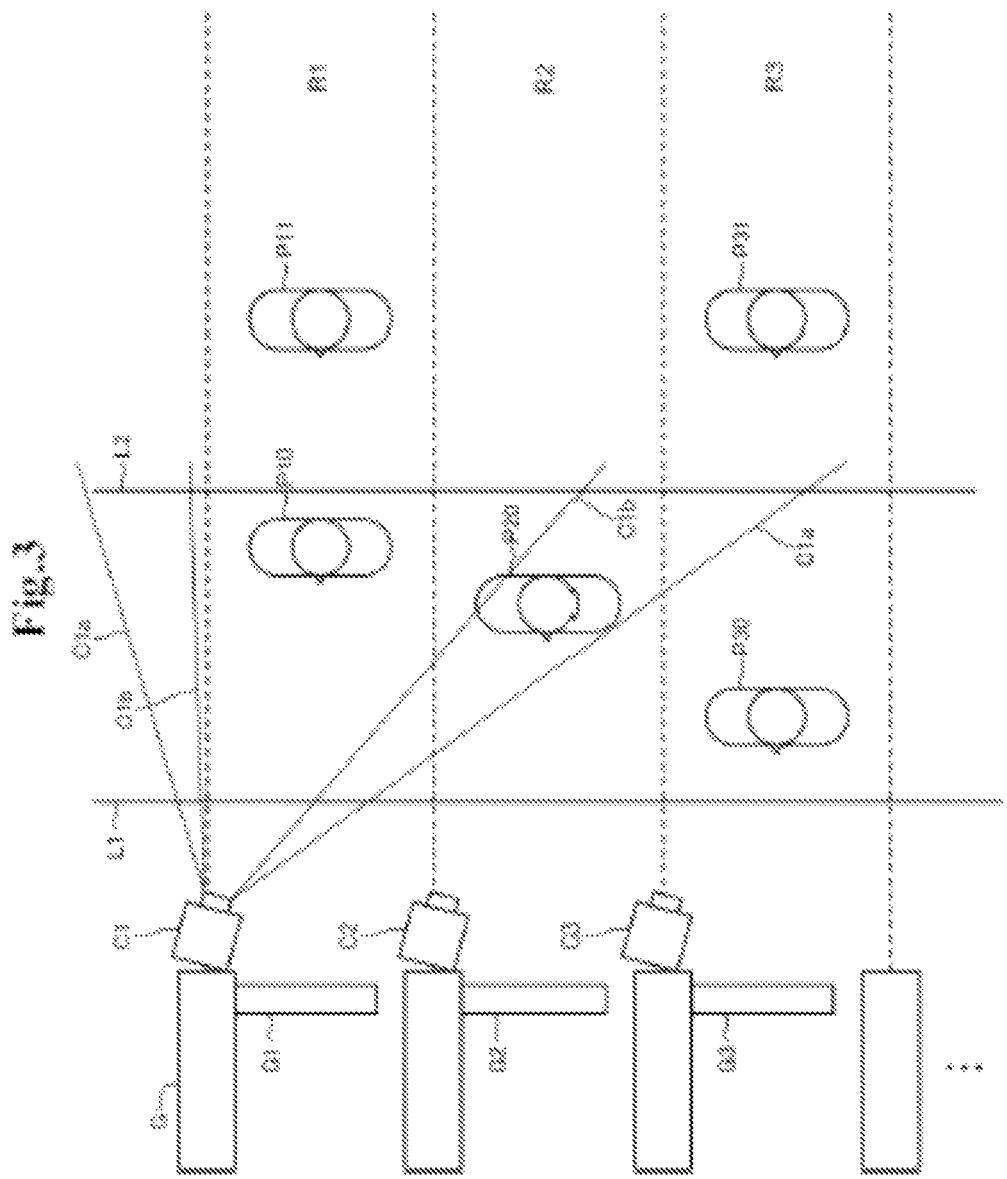

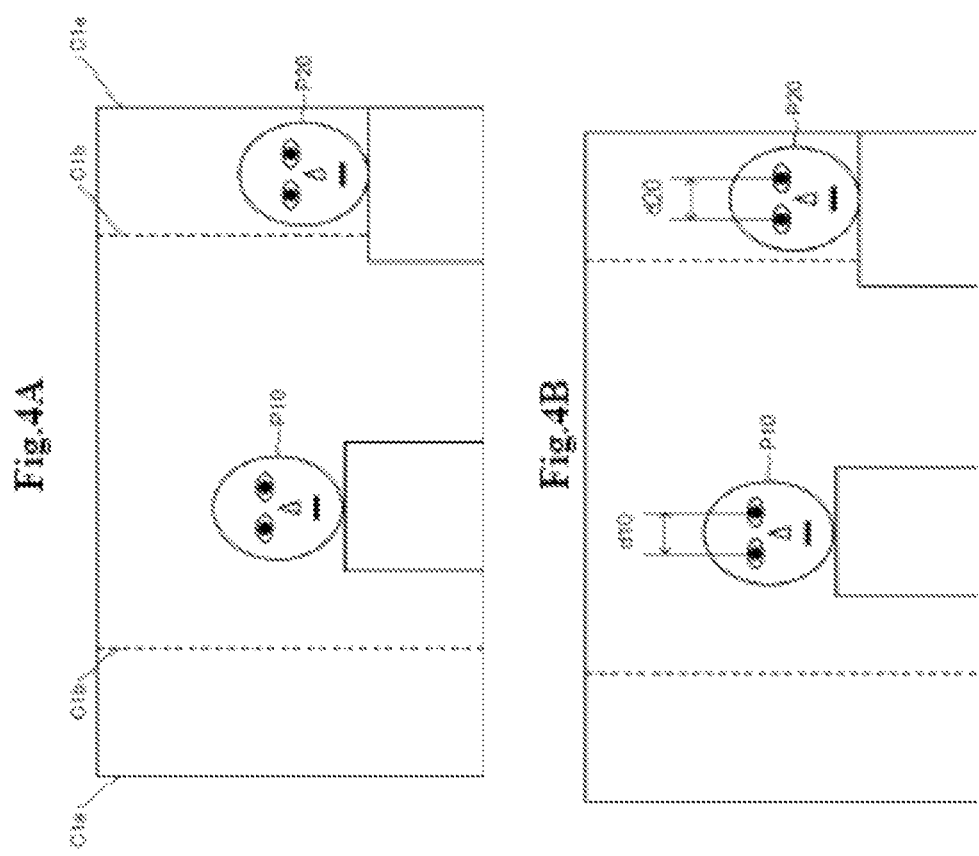

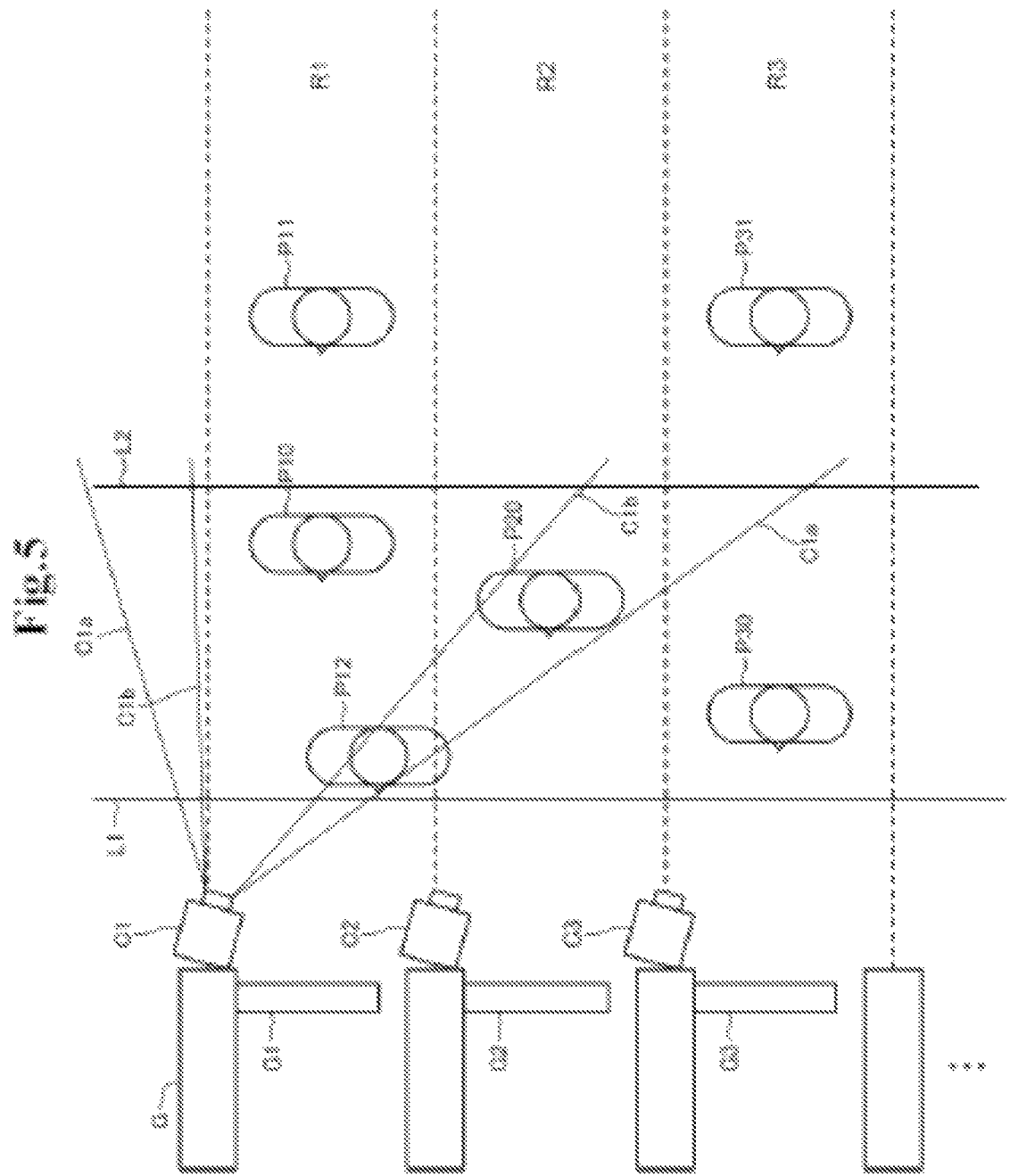

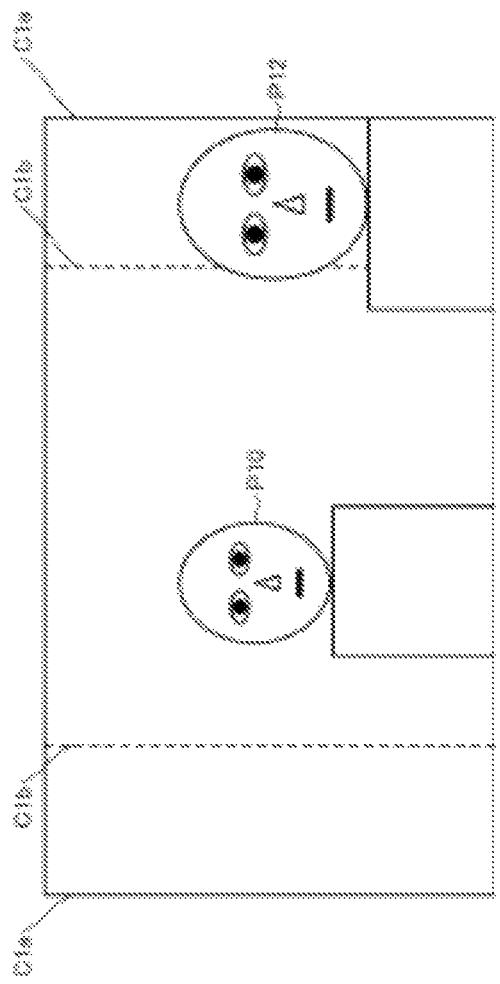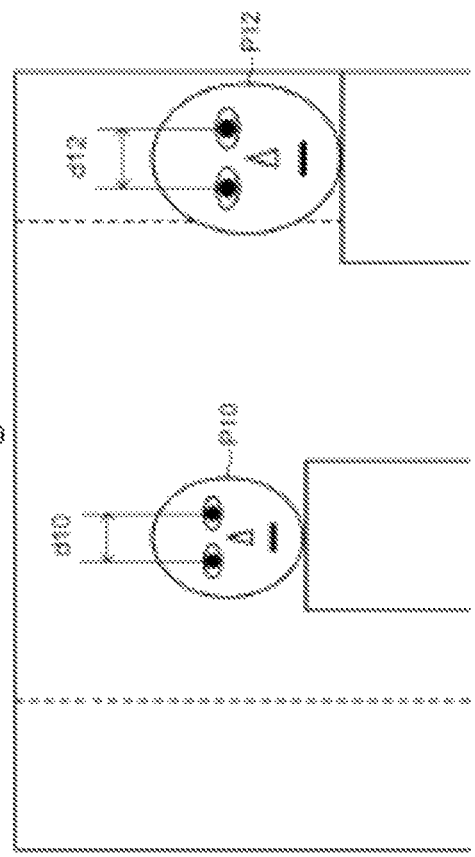

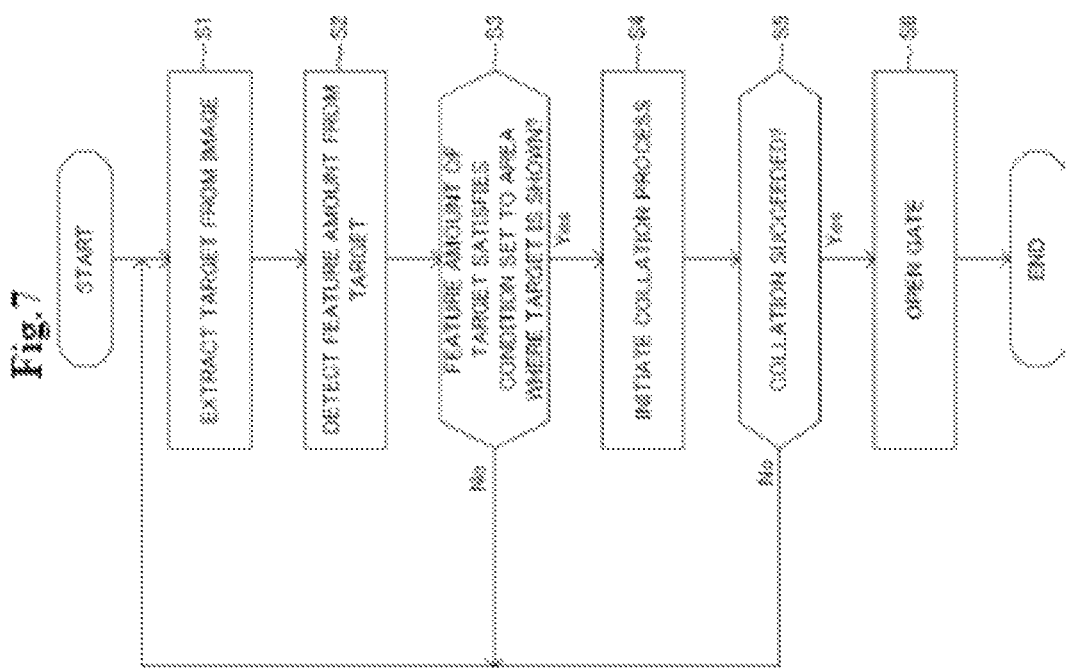

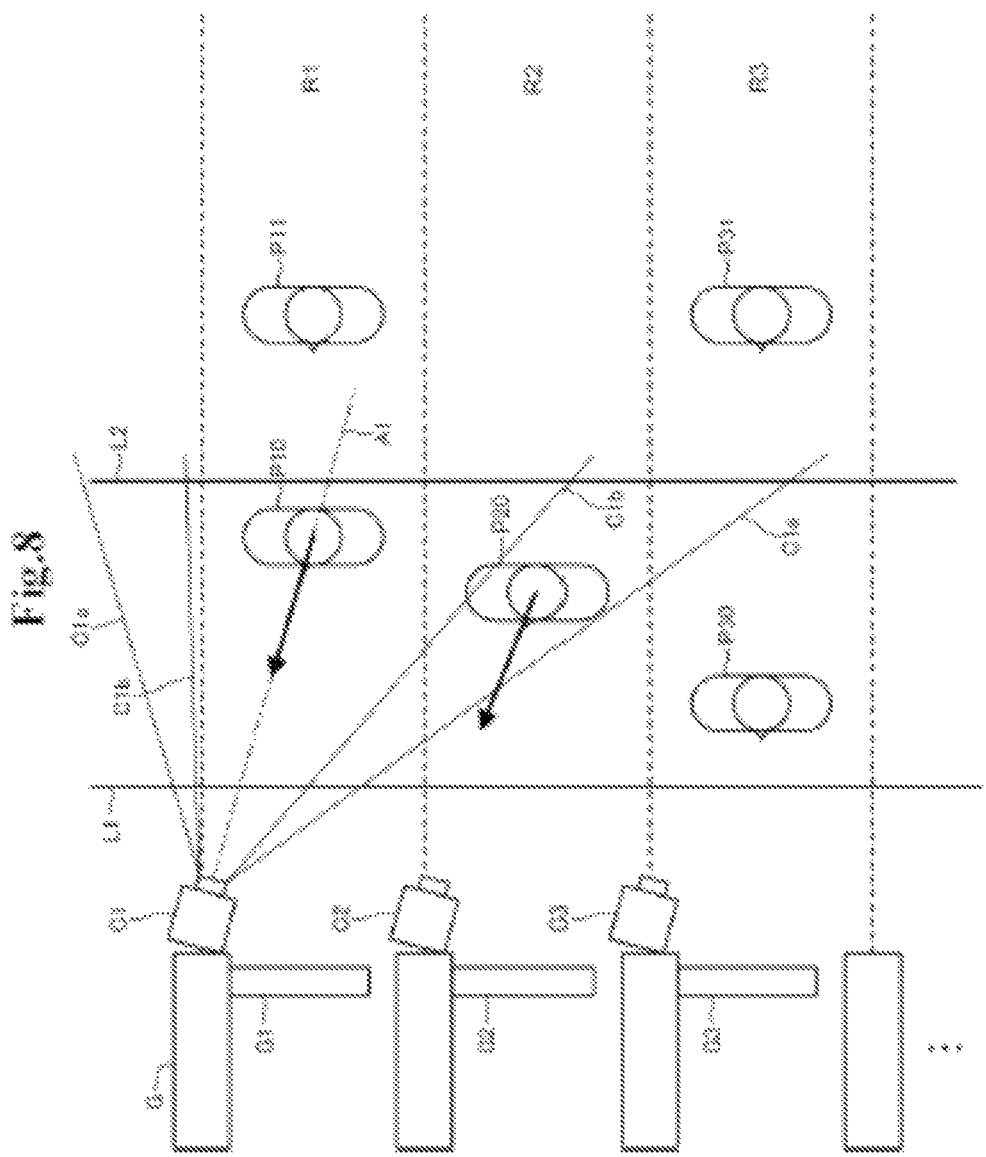

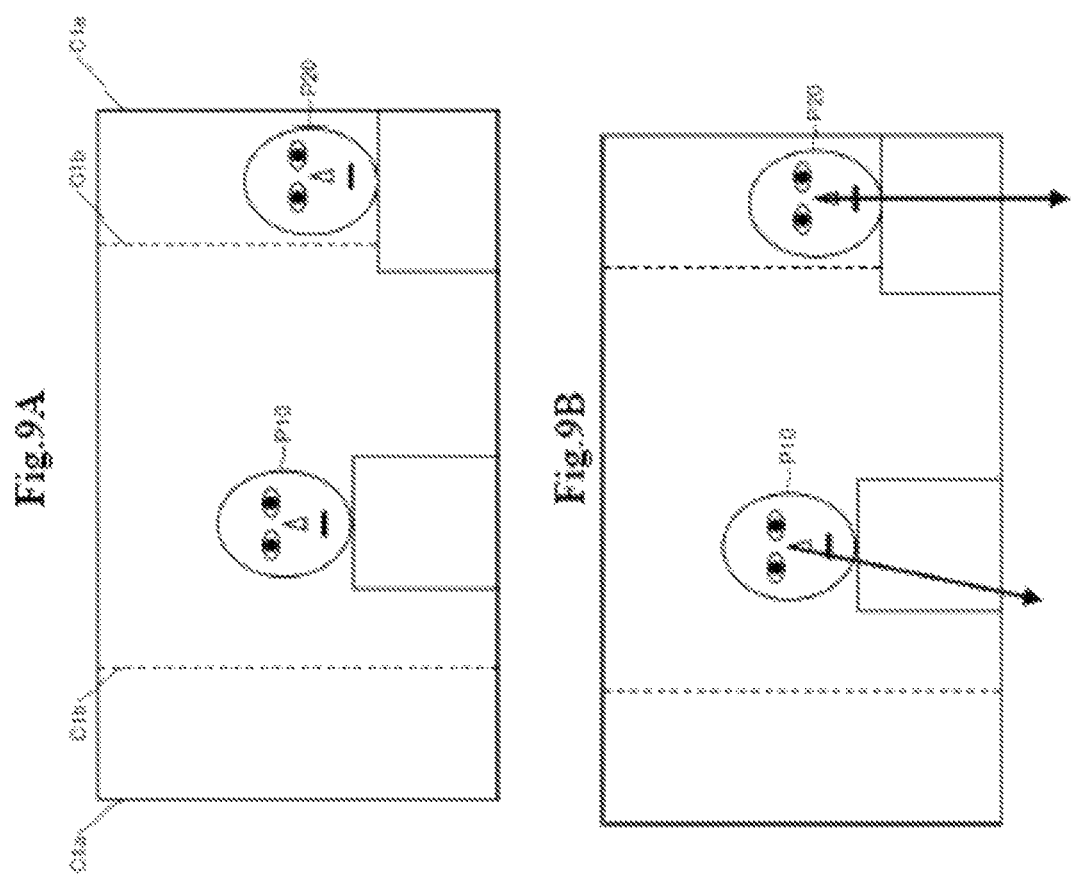

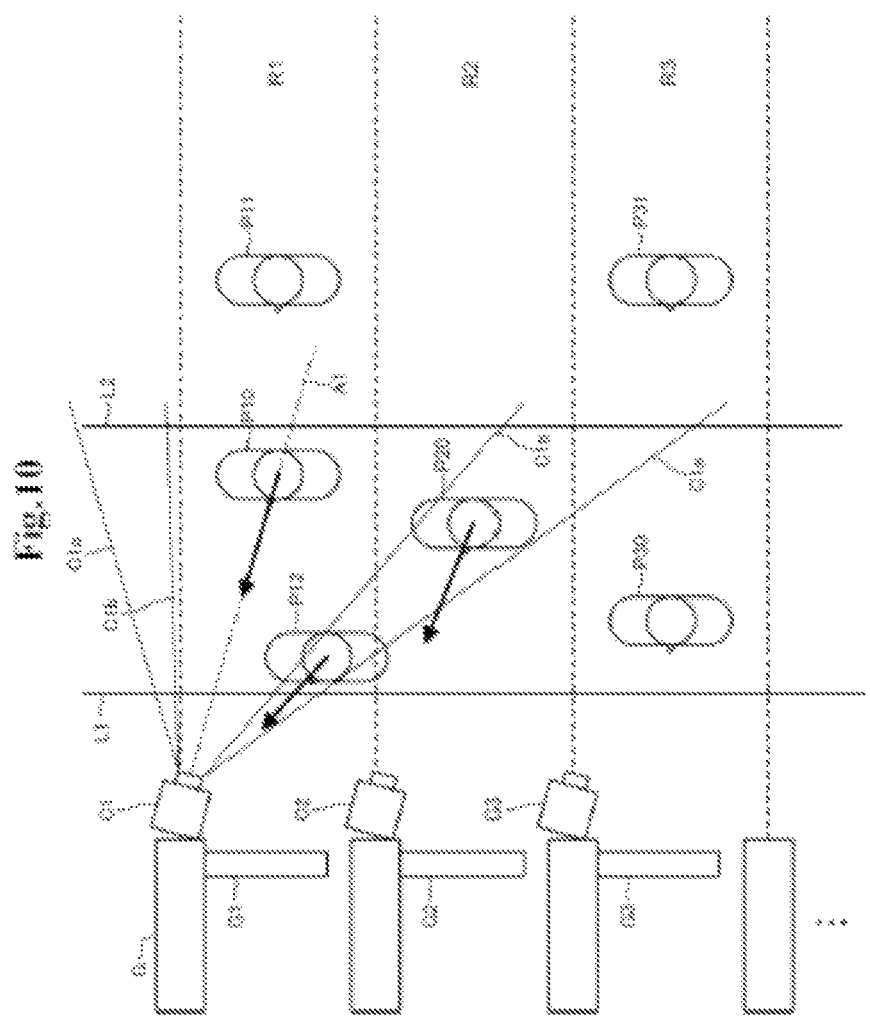

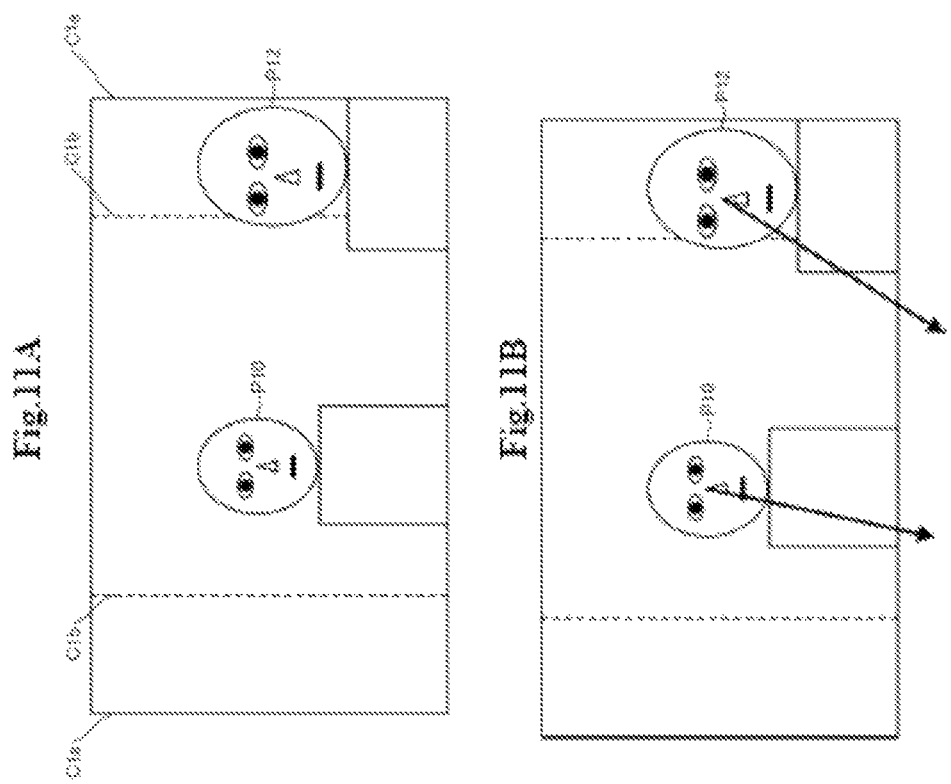

COLLATION SYSTEM

CROSS-REFERENCE TO RELATED APPLICATIONS

The present application is a continuation application of U.S. patent application Ser. No. 18/199,463 filed on May 19, 2023, which is a continuation application of U.S. patent application Ser. No. 17/524,955 filed on Nov. 12, 2021, which is a continuation application of U.S. patent application Ser. No. 16/645,196 filed on Mar. 6, 2020, which issued as U.S. Pat. No. 11,210,496, which is a National Stage Entry of international application PCT/JP2018/029806 filed on Aug. 8, 2018, which claims the benefit of priority from Japanese Patent Application 2017-179063 filed on Sep. 19, 2017, the disclosures of all of which are incorporated in their entirety by reference herein.

TECHNICAL FIELD

The present invention relates to a collation system, and in particular, to a collation system for performing collation on a target that is about to pass through a gate.

BACKGROUND ART

As a means for limiting or managing persons who enter or leave a specific location such as an office or an event site, a collation system is used to perform collation on a person who is about to pass through so as to check whether or not the person is a previously registered person. In particular, since a face authentication technique has been developed recently, a walkthrough face authentication system has been used to perform face authentication from a face image of a person captured by a camera installed at a gate.

Patent Literature 1: JP 2015-1790 A

SUMMARY

In a walkthrough face authentication system, there is a case where a plurality of gates are installed adjacently, and lanes on which persons move toward the respective gates are provided adjacently. In that case, in an image in which persons moving on a lane of a gate are captured, there is a case where a person moving on the adjacent lane toward the adjacent gate is also shown. Therefore, a person moving on the adjacent lane may be erroneously recognized as a person moving on the own lane, which may hinder collation of a person passing through the own gate provided ahead of the own lane. Therefore, in a state where a plurality of gates are installed, erroneous recognition of a person moving toward each gate should be suppressed.

Further, as art related to the walkthrough face authentication system, art described in Patent Literature 1 has been known. Patent Literature 1 presents a problem that authentication is completed when a person is located away from the gate and the gate is opened before the person reaches the gate. In order to solve such a problem, in Patent Literature 1, collation is performed between a captured face image of a person and a registered face image, and based on the size of the collated person on the input image, approaching to the gate of the person is detected.

However, in Patent Literature 1, a collation process is performed on all persons shown in the input image, and then, approaching to the gate of a person whose collation has succeeded is detected. This causes a problem that a processing load of a collation process is always placed on the information processing apparatus.

Further, a problem of erroneous recognition of persons moving toward the respective gates and a problem that a processing load of a collation process is always placed on the information processing apparatus may be caused not only in the case where a target that is about to pass through the gate is a person but also in the case where collation is performed on any target.

Therefore, an object of the present invention is to provide a collation system capable of solving the problems described above, that is, a problem of erroneous recognition of a target that is about to pass through the gate and a problem that a processing load is always placed on the information processing apparatus.

A collation system, according to one aspect of the present invention, includes
an imaging means for acquiring a captured image of a pre-passage side area with respect to a gate;
a collation means for performing a collation process between a previously registered target and a target in the captured image; and
a determination means for determining propriety of passage of the target with respect to the gate, on a basis of a result of the collation process.

The collation means is configured to initiate the collation process on the basis of a condition, set to each area of the captured image, for the target located in the area.

Further, an information processing apparatus, according to one aspect of the present invention, includes
a collation means for performing a collation process between a target in a captured image of a pre-passage side area with respect to a gate and a previously registered target; and
a determination means for determining propriety of passage of the target with respect to the gate, on the basis of a result of the collation process.

The collation means initiates the collation process on the basis of a condition, set to each area of the captured image, for the target located in the area.

Further, a program, according to one aspect of the present invention, is a program for causing an information processing apparatus to realize
a collation means for performing a collation process between a target in a captured image of a pre-passage side area with respect to a gate and a previously registered target; and
a determination means for determining propriety of passage of the target with respect to the gate, on a basis of a result of the collation process.

The collation means is configured to initiate the collation process on the basis of a condition, set to each area of the captured image, for the target located in the area.

Further, a collation method, according to one aspect of the present invention, is a method including, by an information processing apparatus,
performing a collation process between a target in a captured image of a pre-passage side area with respect to a gate and a previously registered target; and
determining propriety of passage of the target with respect to the gate, on a basis of a result of the collation process.

The information processing apparatus is configured to initiate the collation process on the basis of a condition, set to each area of the captured image, for the target located in the area.

Since the present invention is configured as described above, it is possible to suppress erroneous recognition of a target that is about to pass through the gate, and to suppress unnecessary collation processes to thereby reduce the processing load to be placed on the information processing apparatus.

BRIEF DESCRIPTION OF DRAWINGS

FIG. 1 illustrates a used state of a face authentication system according to a first exemplary embodiment of the present invention.

FIG. 2 is a block diagram illustrating a configuration of the face authentication system according to the first exemplary embodiment of the present invention.

FIG. 3 illustrates an imaging state by the face authentication system disclosed in FIG. 1.

FIG. 4A illustrates a captured image captured in the imaging state of FIG. 3 by the face authentication system disclosed in FIG. 1.

FIG. 4B illustrates a captured image captured in the imaging state of FIG. 3 by the face authentication system disclosed in FIG. 1.

FIG. 5 illustrates an imaging state by the face authentication system disclosed in FIG. 1.

FIG. 6A illustrates a captured image captured in the imaging state of FIG. 5 by the face authentication system disclosed in FIG. 1.

FIG. 6B illustrates a captured image captured in the imaging state of FIG. 5 by the face authentication system disclosed in FIG. 1.

FIG. 7 is a flowchart illustrating a processing operation by the face authentication system disclosed in FIG. 1.

FIG. 8 illustrates an imaging state by a face authentication system according to a second exemplary embodiment of the present invention.

FIG. 9A illustrates a captured image captured in the imaging state of FIG. 8 by the face authentication system according to the second exemplary embodiment of the present invention.

FIG. 9B illustrates a captured image captured in the imaging state of FIG. 8 by the face authentication system according to the second exemplary embodiment of the present invention.

FIG. 10 illustrates an imaging state by the face authentication system according to the second exemplary embodiment of the present invention.

FIG. 11A illustrates a captured image captured in the imaging state of FIG. 10 by the face authentication system according to the second exemplary embodiment of the present invention.

FIG. 11B illustrates a captured image captured in the imaging state of FIG. 10 by the face authentication system according to the second exemplary embodiment of the present invention.

EXEMPLARY EMBODIMENTS

First Exemplary Embodiment

Figure 12:
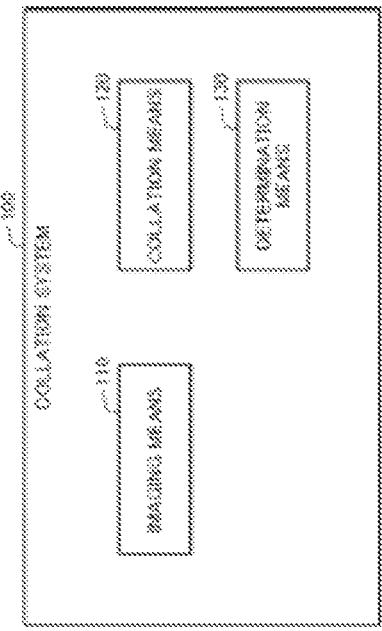
FIG. 12 is a block diagram illustrating a configuration of a collation system according to a third exemplary embodiment of the present invention.

A first exemplary embodiment of the present invention will be described with reference to FIGS. 1 to 7. FIG. 1 illustrates a used state of a face authentication system. FIG. 2 illustrates a configuration of a face authentication system. FIGS. 3 to 7 are diagrams for explaining processing operation of the face authentication system.

[Overall Configuration]

A face authentication system 10 (collation system) of the present invention is a system to be used for limiting and managing entrance/exit of persons (targets) at a specific location such as an office or an event site. For example, an imaging device constituting the face authentication system 10 is installed for each gate that is opened and closed when a person enters or leaves, in the vicinity of the installed location of the gate.

In the example illustrated in FIG. 1, three gates G1, G2, and G3 are adjacently arranged in parallel with each other, and are configured such that persons go through in a direction shown by arrows from the right side in FIG. 1 toward the respective gates G1, G2, and G3. Therefore, the right side area in FIG. 1 with respect to each of the gates G1, G2, and G3 is an area before a person passes through the gate (pre-passage side area). In the pre-passage side areas of the respective gates G1, G2, and G3, lanes R1, R2, and R3, on which persons who are about to pass through the gates G1, G2, and G3 move in lines, are located in parallel with each other corresponding to the gates G1, G2, and G3, respectively. Note that the respective lanes R1, R2, and R3 may or may not be partitioned with some members.

In the state illustrated in FIG. 1, imaging devices C1, C2, and C3 constituting the face authentication system 10 in the present embodiment are installed in the vicinity of the corresponding gates G1, G2, and G3, respectively, on the right side thereof as viewed from the persons moving toward the respective gates G1, G2, and G3. However, the installation positions of the imaging devices are not limited to the positions as illustrated in FIG. 1. They may be installed at any positions such as a left side as viewed toward the gates or above the gates. Note that the face authentication system 10 also has display devices in the vicinity of the imaging devices C1, C2, and C3.

In the face authentication system 10, at the gate G1, for example, an image of a person moving toward the gate G1 is captured by the installed imaging device C1. Then, from a face image of the person shown in the captured image, collation is performed to check whether or not the person is a previously registered person. When the collation succeeded, a process of opening the gate G1 is performed so as to allow the person to pass through. The configuration of the face authentication system 10 will be described in detail below. Note that while description will be given below on the face authentication system 10 provided corresponding to the gate G1, a face authentication system provided corresponding to another gate G2 or G3 has the same configuration.

[Configuration of Face Authentication System]

The face authentication system 10 of the present embodiment is an information processing apparatus including an arithmetic device and a storage device integrally formed with the imaging device C1 (camera) and a display device D1 (display). Put another way, an information processing apparatus having an arithmetic unit that performs face authentication processing and a storage unit, and the display device D1 are mounted on the imaging device C1. However, the face authentication system 10 is not necessarily limited to that integrally formed with the imaging device C1 and the display device D1. For example, the imaging device C1, the display device D1, and the information processing apparatus that processes captured images may be different devices and installed at different locations.

Specifically, as illustrated in FIG. 2, the face authentication system 10 includes the imaging device C1 and the display device D1, and also includes a target extraction unit 11 constructed by execution of a program by the arithmetic unit, a condition determination unit 12, a collation unit 13, and a gate control unit 14. The face authentication system 10 also includes a collation condition storage unit 15 and a collation data storage unit 16 that are constructed in the storage unit.

The imaging device C1 (imaging means) is provided with a camera for acquiring a captured image of a pre-passage side area with respect to the gate G1, that is, an area in front of the gate G1 of the corresponding lane R1, at a predetermined frame rate, and a camera control unit. As illustrated in FIG. 3, the capturing area of the imaging device C1 is a range between lines C1a, for example. Here, the capturing area of the imaging device C1 is set such that a person P10, moving on the lane R1 (own lane) corresponding to the gate G1 at which the imaging device C1 is installed, is located in a center area in the horizontal direction between lines C1b of the capturing area. Note that the captured image is set to be roughly focused in a range of a preset distance in the approaching direction with respect to the imaging device C1, that is, a distance from a line L1 to a line L2 illustrated in FIG. 3, for example.

Since the capturing area of the imaging device C1 is set as described above, in an end area in the horizontal direction with respect to the center area, that is, in an area between the line C1a and the line C1 of the capturing area, a person P20 moving on the lane R2 corresponding to the adjacent gate G2 may be shown, in the state illustrated in FIGS. 3, 4A, and 4B. Further, in the state illustrated in FIGS. 5, 6A, and 6B, a person P12 located on the own lane R1, corresponding to the own gate G1 at which the imaging device C1 is installed, may be shown in the end area. Even if such a state is caused, the face authentication system 10 of the present invention is configured to enable determination of propriety of gate passage by appropriately recognize the person P12 who is about to pass through the own gate G1, and to reduce the processing load.

The target extraction unit 11 (target information detection means) acquires a captured image from the imaging device C1, and detects determination information (target information) to be used for determining whether or not to initiate a collation process, as described below, for example. First, a face area of a person who is a processing target is extracted from a captured image. Extraction of a face area of a person is performed by determining the position, color, and the like with respect to the entire image of a moving person. Then, the target extraction unit 11 detects the feature of the person as determination information, from the face area. In the present embodiment, a feature as determination information is a distance between the eyes of a person (inter-eye distance), and is detected as denoted by references signs d10, d20, and d12 illustrated in FIGS. 4A, 4B, 6A, and 6B. However, a method of detecting the inter-eye distance is not limited to the methods described above. Detection may be performed by any method. Also, the determination information may be any information representing a feature of a person, and may be detected by any method.

The condition determination unit 12 (collation means) determines whether or not the inter-eye distance d10, d20, or d12 that is a feature of a person as determination information detected by the target extraction unit 11 satisfies the condition for initiating a collation process. In the present embodiment, as the condition for initiating a collation process, different values are set to areas where a person is located in the captured image, that is, different values are set to a center area and an end area in the captured image. Such values are stored in advance in the collation condition storage unit 15. For example, as a condition value Tc corresponding to the center area of a captured image, when a person is located on the lane R1 of the own gate G1, a value that must be exceeded by the inter-eye distance of the person is set. On the other hand, as a condition value Te corresponding to the end area of the capture image, a value larger than the value Tc set to the center area is set (Te>Tc). As an example, as the condition value Te corresponding to the end area, a value that is smaller than the inter-eye distance d12 of a person P12 located closer to the imaging device 1 on the lane R1 of the own gate G1 as illustrated in FIGS. 5, 6A and 6B, and is larger than the inter-eye distance d20 of a person P20 on the adjacent lane R2 as illustrated in FIGS. 3, 4A, and 4B, is set.

In the above-described state, the condition determination unit 12 determines whether or not the inter-eye distance d10, d20, or d12 that is a feature of the person as determination information exceeds the condition value (Tc or Te) set to the area in the captured image where the person is located. For example, in the case of FIGS. 3, 4A, and 4B, for a person P10 located in the center area of the captured image, it is determined whether or not the inter-eye distance d10 exceeds the condition value Tc set to the center area. Meanwhile, for the person P20 located in the end area of the captured image, it is determined whether or not the inter-eye distance d20 exceeds the condition value Te set to the end area. Similarly, in the case of FIGS. 5, 6A, and 6B, for the person P10 located in the center area of the captured image, it is determined whether or not the inter-eye distance d10 exceeds the condition value Tc set to the center area. Meanwhile, for the person P12 located in the end area of the captured image, it is determined whether or not the inter-eye distance d12 exceeds the condition value Te set to the end area. In the example of FIGS. 3, 4A, and 4B, the person P10 in the center area satisfies the condition and the person P20 in the end area does not satisfy the condition. In the example of FIGS. 5, 6A, and 6B, the person P10 in the center area satisfies the condition and the person P12 in the end area also satisfies the condition.

When the condition determination unit 12 determines that the inter-eye distance of a person exceeds the condition value set to the area where the person is located, that is, when the condition is satisfied, the collation unit 13 (collation means) initiates a collation process with respect to such a person. In other words, the collation unit 13 does not perform a collation process on a person determined, by the condition determination unit 12, that the condition is not satisfied. Here, a collation process is performed as described below, for example. First, a feature amount required for collation is generated from the face area of a person who is a target of a collation process. Then, a collation score such as similarity between the generated feature amount and the feature amount of the person having been registered in the collation data storage unit 16 is calculated, and it is determined whether or not the collation score is higher than a threshold. When the collation score is higher than the threshold, it is determined that the collation has succeeded and that the person who is about to pass through the gate G1 is the person having been registered. At this time, the feature amount of the person to be detected for collation may be a feature amount used in an existing face collation technique, and may be a feature amount calculated by any method. Also, as the collation method, any method may be used.

The gate control unit 14 (determination means) first determines propriety of passage of the person with respect to the gate G1, based on the collation result by the collation unit 13. Specifically, it is determined that the person whose collation by the collation unit 13 has been succeeded is allowed to pass through. The gate control unit 14 also has a function of displaying the collation result, that is, success or failure of collation, on the display device D1. Moreover, the gate control unit 14 also has a gate control function to open or close the gate G1, and performs control to open the gate for the person determined to be allowed to pass through.

Note that the display device D1 is installed such that the display surface faces the pre-passage side area of the gate G1 so as to be viewable by the person who is about to pass through the gate G1. However, the display device D1 is not necessarily provided.

[Operation]

Next, operation of the face authentication system 10 as described above will be described with reference to the flowchart of FIG. 7. Here, operation of the face authentication system 10 corresponding to the gate G1 will be described. Description will be given on the case where the capturing state by the imaging device C1 is as illustrated in FIGS. 3 to 6B, as an example.

The imaging device C1 corresponding to the gate G1 continuously captures images of the pre-passage side area of the gate G1. Then, the face authentication system 10 regularly performs processing, as described below, on the captured images.

First, the target extraction unit 11 extracts a person (target) to be processed from a captured image (step S1). Then, from the extracted person, the target extraction unit 11 detects a feature of the person, that is, an inter-eye distance of the person in this case, as determination information necessary for performing condition determination for initiating the collation process (step S2). For example, the inter-eye distance is detected as denoted by the reference sign d10 or d20 of FIG. 4 or the reference sign d10 or d12 of FIG. 6.

Then, the condition determination unit 12 determines whether or not the inter-eye distance that is the detected determination information satisfies the condition for initiating the collation process. At this time, since a condition value is set to each area where the person is located, the condition determination unit 12 reads the condition value corresponding to the location of the person from the collation condition storage unit 15, and determines whether or not the detected inter-eye distance exceeds the condition value (step S3). Similarly, in the example of FIGS. 3, 4A, and 4B, it is determined that the inter-eye distance d10 of the person P10 located in the center area of the captured image exceeds the condition value Tc set to the center area. Then, it is determined that the inter-eye distance d20 of the person P20 located in the end area of the captured image does not exceed the condition value Te, set to the end area, that is a larger value than the value Tc. Therefore, it is determined that only the person P10 satisfies the condition for initiating the collation process (Yes at step S3). Similarly, in the example of FIGS. 5, 6A, and 6B, it is determined that the inter-eye distance d10 of the person P10 located in the center area of the captured image exceeds the condition value Tc set to the center area. Then, it is determined that the inter-eye distance d12 of a person P12 located in the end area of the captured image exceeds the condition value Te set to the end area. Therefore, in the example of FIGS. 5, 6A, and 6B, it is determined that the person P10 and the person P12 satisfy the condition for starting the collation process (Yes at step S3).

Then, the collation unit 13 initiates the collation process with respect to the person determined, by the condition determination unit 12, that the inter-eye distance exceeds the condition value set to each area (step S4). In the example of FIGS. 3, 4A, and 4B, the collation unit 13 initiates the collation process only for the person P10, and in the example of FIGS. 5, 6A, and 6B, the collation unit 13 initiates the collation process for the person P10 and the person P12. In the collation process, first, a feature amount necessary for collation is detected from the face area of the person who is a target of the collation process, and the feature amount is collated with the feature amount of the person having been registered in the collation data storage unit 16, whereby a collation score is acquired. Then, it is determined whether or not the collation score exceeds a threshold. In the example of FIGS. 5, 6A, and 6B, while the person P10 and the person P12 are collation targets, the collation process may be initiated for the person P12 having a larger inter-eye distance that is determination information in preference, to determine propriety of passage and to open or close the gate, as described below.

As a result of the collation process by the collation unit 13, when collation of the person who is about to pass through has succeeded (Yes at step S5), the gate control unit 14 (determination means) allows passage of the person with respect to the gate G1 and performs control to open the gate G1 (step S6). At that time, the gate control device 14 displays propriety of passage on the display device D1.

As described above, according to the face authentication system 10 of the present embodiment, it is possible to suppress a collation process with respect to the person P20 who is about to pass through the adjacent gate G2, and to perform a collation process appropriately on the persons P10 and P12 who are about to pass through the own gate G1. For example, in the example of FIGS. 3, 4A, and 4B, a collation process is performed on the person P10 who is about to pass through the own rage G1 but is not performed on the person P20 who is about to pass through the adjacent gate G2. Further, in the example of FIGS. 5, 6A, and 6B, even for the person P12 shown in the end area of the captured image, since the person P12 is about to pass through the own gate G1, a collation process is performed appropriately. Consequently, it is possible to suppress erroneous recognition of a person who is about to pass through another gate, and to suppress unnecessary collation processes to thereby reduce the processing load on the information processing apparatus.

Note that although an example is given for the case where area inside the captured image is divided into a center area and end areas in the horizontal direction, it may be divided into different areas. Even in that case, a condition for initiating a collation process is set to each area.

Further, while description has been given on the case where the determination information that is a feature of a person to be compared with a condition value for initiating a collation process is an inter-eye distance, the determination information may be a distance between other parts constituting the face of a person, or a value representing the size of another part of a person. Corresponding to it, a condition value for initiating a collation process is set to each area of the captured image.

Further, while description has been given, as an example, on the case where a target that is about to pass through the gate G1 is a person, it is not limited to a person but may be any object. For example, an object such as baggage is also acceptable. Corresponding to it, determination information representing a feature of a target to be compared with a condition value for initiating a collation process may be information representing any feature that can be detected from the object. Further, for performing a collation process, any feature amount that can be detected from the object may be used.

Second Exemplary Embodiment

A second exemplary embodiment of the present invention will be described with reference to FIGS. 8 to 11B. FIGS. 8 to 11A are diagrams for explaining a processing operation of a face authentication system.

A face authentication system 10 of the present embodiment has a configuration similar to that of the face authentication system of the first exemplary embodiment described above. However, the criterion for determining whether or not a condition for initiating a collation process differs. This means that in the present embodiment, the orientation of a person with respect to the gate G1 is detected as determination information from a captured image, and when the determination information satisfies the condition set from each area of the captured image, a collation process is initiated. A configuration different from that of the first exemplary embodiment will be mainly described in detail below.

The target extraction unit 11 (target information detection means) of the present embodiment first extracts the face area of a person to be processed from a captured image. Then, as a feature of the person that is determination information to be used for determining whether or not to initiate a collation process, the target extraction unit 11 detects the orientation of the face of the person with respect to the own gate G1. Specifically, as determination information, an angle of the front face with respect to an optical axis A1 of the imaging device C1 is detected. For example, parts such as eyes, nose, and mouth constituting the face of a person are extracted and the absolute orientation of the face is detected from the positional relationship between them, and further, the installation angle of the imaging device C1 is also considered, whereby an angle of the face with respect to the imaging device C1 can be detected. Note that the orientation of the face may be detected by any method.

Then, the condition determination unit 12 (collation means) of the present embodiment determines whether or not the angle of the face with respect to the imaging device C1 that is determination information detected by the target extraction unit 11 satisfies the condition for initiating the collation process set to each area of the captured image. In the present embodiment, as the condition for initiating the collation process, different values are set to the center area and the end area in the horizontal direction of the captured image. Such values are stored in advance in the collation condition storage unit 15.

Here, condition values that are set corresponding to the center area and the end area of the captured image respectively will be described. As illustrated in FIGS. 8, 9A, and 9B, a person P10 located in the center area of the captured image and moving toward the own gate G1 has a high possibility of facing the capturing direction of the imaging device. Therefore, it is highly likely that an angle defined by the direction of an optical axis A1 of the imaging device C1 and the direction of the front face of the person P10 is extremely small. On the other hand, regarding a person P20 located in the end area of the captured image and moving toward the adjacent gate G2, there is a high possibility that the person P20 faces the capturing direction of the imaging device C2 installed at the gate G2. Therefore, there is a high possibility that the person P20 does not face the capturing direction of the imaging device C1. Therefore, it is highly likely that an angle defined by the direction of the optical axis A1 of the imaging device C1 and the direction of the front face of the person P20 is extremely large.

In addition, as illustrated in FIGS. 10, 11A, and 11B, in the case of a person P12 who is located in the end area of the captured image but moving toward the own gate G1, there is a high possibility that the person P12 faces the capturing direction of the imaging device C1. Therefore, it is highly likely that an angle defined by the direction of the optical axis A1 of the imaging device C1 and the direction of the face of the person P12 is smaller than the angle of the person P20 located on the lane R2 of the adjacent gate G2.

In consideration of the fact described above, since it is expected that the angle that is a feature of the person P10 located in the center area and moving toward the own gate G1 has an extremely small value, the condition value corresponding to the center area of the captured image is set to a small value that includes such an angle. Therefore, the condition value corresponding to the center area is set to 10°, for example. Meanwhile, the condition value corresponding to the end area of the captured image is set to be larger than the condition value corresponding to the center area. This is because an angle that is determination information of the person P12 located in the end area and moving toward the own gate G is expected to be larger than that of the person P10 in the center area. However, the condition value corresponding to the end area is set to a value smaller than the expected angle of the person P20 of the adjacent gate G2. Therefore, the condition value corresponding to the end area is set to 60°, for example. However, the condition value is not limited to the values described above. It may be set appropriately, depending on the situation such as gate arrangement.

In the above-described state, the condition determination unit 12 determines whether or not the angle of the face with respect to the imaging device C1, that is, a feature of the person as determination information, is equal to or smaller than the condition value set to the area in the captured image where the person is located. For example, in the case of FIGS. 8, 9A, and 9B, for the person P10 located in the center area of the captured image, it is determined whether or not the angle thereof is equal to or smaller than the condition value set to the center area, and for the person P20 located in the end area of the captured image, it is determined whether or not the angle thereof is equal to or smaller than the condition value set to the end area. Similarly, in the case of FIGS. 10, 11A, and 11B, for the person P10 located in the center area of the captured image, it is determined whether or not the angle thereof is equal to or smaller than the condition value set to the center area, and for the person P12 located in the end area of the captured image, it is determined whether or not the angle thereof is equal to or smaller than the condition value set to the end area. In the example of FIGS. 8, 9A, and 9B, the person P10 in the center area satisfies the condition and the person P20 in the end area does not satisfy the condition. In the example of FIGS. 10, 11A, and 11B, the person P10 in the center area satisfies the condition and the person P12 in the end area also satisfies the condition.

When the condition determination unit 12 determines that the angle of a person with respect to the imaging device C1 is equal to or smaller than the condition value set to the area where the person is located, that is, the condition is satisfied, the collation unit 13 (collation means) initiates a collation process for the person. In other words, the collation unit 13 does not perform a collation process for a person determined, by the condition determination unit 12, that the condition is not satisfied.

As described above, according to the face authentication system 10 of the present embodiment, it is possible to suppress collation processes with respect to persons who are about to pass through the adjacent gate G2, and to perform a collation process appropriately on a person who is about to pass through the own gate G1. Consequently, it is possible to suppress erroneous recognition of a person who is about to pass through another gate, and to suppress unnecessary collation processes to thereby reduce the processing load of the information processing apparatus.

Note that the orientation of the face that is a feature of a person as the determination information is not limited to the orientation of the face with respect to the imaging device C1. It may be a value of any criterion. Also, a condition value for initiating a collation process is not limited to the value described above but may be any value.

Third Exemplary Embodiment

Figure 13:
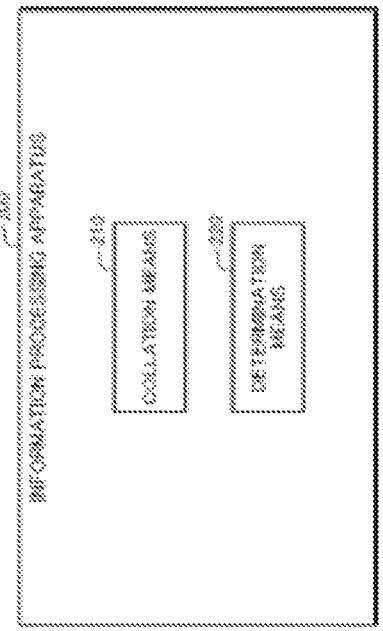
FIG. 13 is a block diagram illustrating a configuration of an information processing apparatus according to the third exemplary embodiment of the present invention.

Next, a third exemplary embodiment of the present invention will be described with reference to FIGS. 12 and 13. FIG. 12 is a block diagram illustrating a configuration of a collation system according to the third exemplary embodiment. FIG. 13 is a block diagram illustrating a configuration of an image processing apparatus according to the third exemplary embodiment. Note that the present embodiment shows the outline of the configuration of the face authentication system described in the first exemplary embodiment and the second exemplary embodiment.

As illustrated in FIG. 12, a collation system 100 of the present embodiment includes
an imaging means 110 for acquiring a captured image of a pre-passage side area with respect to a gate,
a collation means 120 for performing a collation process between a previously registered target and a target in the captured image, and
a determination means 130 for determining propriety of passage of the target with respect to the gate, on the basis of a result of the collation process.

The collation means 120 is configured to initiate the collation process on the basis of a condition, for the target located in the area, set to each area of the captured image.

In the present embodiment, the imaging means 110 may be removed from the collation system 100 illustrated in FIG. 12.

That is, an information processing apparatus 200 of the present embodiment includes
a collation means 210 for performing a collation process between a target in a captured image of a pre-passage side area with respect to a gate, and a previously registered target, and
a determination means 220 for determining propriety of passage of the target with respect to the gate, on the basis of a result of the collation process.

The collation means 210 is configured to initiate the collation process on the basis of a condition, for the target located in the area, set to each area of the captured image.

Note that each of the collation means 120, 210 and the determination means 130, 220 may be constructed by execution of a program by an arithmetic unit, or may be constructed by an electronic circuit.

According to the collation system 100 or the information processing apparatus 200 having the configurations described above,
a collation method including
performing a collation process between a target in a captured image of a pre-passage side area with respect to a gate, and a previously registered target, and
determining propriety of passage of the target with respect to the gate, on the basis of a result of the collation process, is provided.

Such a collation method has a configuration of initiating the collation process for the target located in an area, on the basis of a condition that is set to each area of the captured image.

According to the collation system 100 or the information processing apparatus 200, for a target located in a given area of a captured image, a collation process is initiated when the target satisfies the condition set to the area. Therefore, even if a target who is about to pass through another gate is shown in a captured image, it is possible to prevent initiation of a collation process with respect to the target, depending on the condition set to the area where the target is shown. Consequently, it is possible to suppress erroneous recognition of a person who is about to pass through a gate, and to suppress an unnecessary collation process to thereby reduce the processing load on the information processing apparatus.

Supplementary Notes

The whole or part of the exemplary embodiments disclosed above can be described as, but not limited to, the following supplementary notes. Hereinafter, outlines of the configurations of a collation system, an information processing apparatus, a program, and a collation method, according to the present invention, will be described. However, the present invention is not limited to the configurations described below.

(Supplementary Note 1)

A collation system comprising:

imaging means for acquiring a captured image of a pre-passage side area with respect to a gate;

collation means for performing a collation process between a previously registered target and a target in the captured image; and determination means for determining propriety of passage of the target with respect to the gate, on a basis of a result of the collation process, wherein the collation means initiates the collation process on a basis of a condition, set to each area of the captured image, for the target located in the area.

According to the configuration described above, the collation system initiates a collation process for a target located in a given area of a captured image when the target satisfies the condition set to the area. Therefore, even if a target who is about to pass through another gate is shown in the captured image, it is possible to prevent initiation of a collation process with respect to the target according to the condition set to the area where the target is shown. Consequently, it is possible to suppress erroneous recognition of a person who is about to pass through a gate, and to suppress unnecessary collation processes to thereby reduce the processing load on the information processing apparatus.

(Supplementary Note 2)

The collation system according to supplementary note 1, further comprising target information detection means for detecting target information representing a feature of the target in the captured image, wherein the collation means initiates the collation process for the target when the target information of the target in the captured image satisfies a condition set to an area of the captured image in which the target is located.

According to the configuration described above, target information representing a feature of the target in the captured image is detected, and when the target information satisfies the condition set to each area of the captured image, a collation process for the target is initiated. Therefore, by setting a condition not to initiate a collation process to the target information of the target, it is possible to suppress erroneous recognition of the person and to suppress unnecessary collation processes.

(Supplementary Note 3)

The collation system according to supplementary note 2, wherein the collation means initiates the collation process for the target when the target information of the target in the captured image satisfies a condition set to each area divided in a horizontal direction of the captured image in which the target is located.

By setting a condition for each area divided in the horizontal direction as described above, erroneous recognition of the target and an unnecessary collation process can be suppressed.

(Supplementary Note 4)

The collation system according to supplementary note 3, wherein the target information detection means detects a size of the target as the target information, the collation means initiates the collation process for the target when the target information of the target in the captured image is larger than a value that is a condition set to each area of the captured image in which the target is located, and a value that is a condition for the target information of the target, set to an end area relative to a center area in the horizontal direction of the captured image, is set to be larger than a value that is a condition for the target information of the target set to the center area.

(Supplementary Note 5)

The collation system according to supplementary note 4, wherein the target information detection means detects a distance between predetermined parts of a face of a person that is the target, as the target information representing the size of the target.

According to the configuration described above, a condition with respect to the size of the target shown in the end area is set to be larger than the size of the target shown in the center area. For example, in the case where the target is a person, a condition for the distance between predetermined parts of the face of a person is set to be larger in the end area than that in the center area. Therefore, when the target who is about to pass through the adjacent gate is shown in the end area, since the size of the target does not satisfy the condition, erroneous recognition of the target and an unnecessary collation process can be suppressed. On the other hand, when the target who is about to pass through the corresponding gate is shown in the end area, the size of the target satisfies the condition. Therefore, a collation process can be initiated appropriately.

(Supplementary Note 6)

The collation system according to supplementary note 3, wherein the target information detection means detects orientation of the target with respect to the gate as the target information, the collation means initiates the collation process for the target when the target information of the target in the captured image satisfies a condition set to each area of the captured image in which the target is located, and a condition for the target information of the target, set to an end area relative to a center area in the horizontal direction of the captured image, and a condition for the target information of the target, set to the center area, are different from each other.

(Supplementary Note 7)

The collation system according to supplementary note 6, wherein the target information detection means detects an angle of a face of a person that is the target with respect to the imaging means as the target information representing the orientation of the target, on a basis of a position of a predetermined part of the face of the person, the collation means initiates the collation process for the target when the angle that is the target information of the target in the captured image is equal to or smaller than a value that is a condition set to each area of the captured image in which the target is located, and a value that is a condition for the target information of the target, set to an end area relative to a center area in the horizontal direction of the captured image, is set to be larger than a value of an angle that is a condition for the target information of the target set to the center area.

According to the configuration described above, a condition with respect to the orientation of the target is set to be different between the center area and the end area. For example, in the case where the target is a person, a condition for an angle of the face of a person with respect to the imaging device is set to be larger in the end area than that in the center area. Therefore, when the target who is about to pass through the corresponding gate, since the angle of the target satisfies the condition, a collation process can be initiated appropriately. On the other hand, when the target who is about to pass through the adjacent gate is shown in the end area, the angle of the target does not satisfy the condition. Therefore, erroneous recognition of the target and an unnecessary collation process can be suppressed.

(Supplementary Note 8)

An information processing apparatus comprising:

collation means for performing a collation process between a target in a captured image of a pre-passage side area with respect to a gate and a previously registered target; and determination means for determining propriety of passage of the target with respect to the gate, on a basis of a result of the collation process, wherein the collation means initiates the collation process on a basis of a condition, set to each area of the captured image, for the target located in the area.

(Supplementary Note 9)

The information processing apparatus according to supplementary note 8, further comprising
- target information detection means for detecting target information representing a feature of the target in the captured image, wherein
- the collation means initiates the collation process for the target when the target information of the target in the captured image satisfies a condition set to an area of the captured image in which the target is located.

(Supplementary Note 10)

A program for causing an information processing apparatus to realize:
- collation means for performing a collation process between a target in a captured image of a pre-passage side area with respect to a gate and a previously registered target; and
- determination means for determining propriety of passage of the target with respect to the gate, on a basis of a result of the collation process, wherein
- the collation means initiates the collation process on a basis of a condition, set to each area of the captured image, for the target located in the area.

(Supplementary Note 11)

The program according to supplementary note 10, further causing the information processing apparatus to realize
- target information detection means for detecting target information representing a feature of the target in the captured image, wherein
- the collation means initiates the collation process for the target when the target information of the target in the captured image satisfies a condition set to an area of the captured image in which the target is located.

(Supplementary Note 12)

A collation method comprising, by an information processing apparatus:
- performing a collation process between a target in a captured image of a pre-passage side area with respect to a gate and a previously registered target; and
- determining propriety of passage of the target with respect to the gate, on a basis of a result of the collation process, wherein
- the information processing apparatus initiates the collation process on a basis of a condition, set to each area of the captured image, for the target located in the area.

(Supplementary Note 13)

The collation method according to supplementary note 12, further comprising
- by the information processing apparatus, detecting target information representing a feature of the target in the captured image, wherein
- the information processing apparatus initiates the collation process for the target when the target information of the target in the captured image satisfies a condition set to an area of the captured image in which the target is located.

It should be noted that the program described above may be stored in a storage device or stored on a computer-readable storage medium. The storage medium is a portable medium such as a flexible disk, an optical disk, a magneto-optical disk, or a semiconductor memory, for example.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2017-179063, filed on Sep. 19, 2017, the disclosure of which is incorporated herein in its entirety by reference.

REFERENCE SIGNS LIST 10 face authentication system
11 target extraction unit
12 condition determination unit
13 collation unit
14 gate control unit
15 collation condition storage unit
16 collation data storage unit
100 collation system
110 imaging means
120 collation means
130 determination means
200 information processing apparatus
210 collation means
220 determination means
C1, C2, C3 imaging device
D1 display device
G1, G2, G3 gate

The invention claimed is:

1. An information processing method performed by a computer and comprising:
- acquiring a captured image of a pre-passage side area of a first gate corresponding to a first lane, the captured image including at least a part of a pre-passage side area of a second gate corresponding to a second lane adjacent to the first lane;
- detecting a feature amount of a person moving on the first lane and a feature amount of a person moving on the second lane from the captured image; and
- recognizing the person moving on the first lane on a basis of the feature amount of the person moving on the first lane and the feature amount of the person moving on the second lane, the person moving on the first lane and the person moving on the second lane located in an end area in a horizontal direction in the captured image.

2. The information processing method according to claim 1, further comprising:
- in a case where the feature amount of the person moving on the first lane or the feature amount of the person moving on the second lane exceeds a value set to the end area, recognizing the person having the feature amount exceeding the value as the person moving on the first lane.

3. The information processing method according to claim 1, further comprising:
- determining whether to initiate a collation process on a basis of whether or not the recognized person is on the first lane.

4. The information processing method according to claim 1, further comprising:
- determining a priority order for a collation process on the basis of the feature amount of the person moving on the first lane and the feature amount of the person moving on the second lane.

5. An information processing device comprising:
- at least one memory storing instructions; and
- at least one processor configured to execute instructions to:

acquire a captured image of a pre-passage side area of a first gate corresponding to a first lane, the captured image including at least a part of a pre-passage side area of a second gate corresponding to a second lane adjacent to the first lane;

detect a feature amount of a person moving on the first lane and a feature amount of a person moving on the second lane from the captured image; and recognize the person moving on the first lane on a basis of the feature amount of the person moving on the first lane and the feature amount of the person moving on the second lane, the person moving on the first lane and the person moving on the second lane located in an end area in a horizontal direction in the captured image.

6. The information processing device according to claim 5, wherein the at least one processor is configured to execute the instructions to in a case where the feature amount of the person moving on the first lane or the feature amount of the person moving on the second lane exceeds a value set to the end area, recognize the person having the feature amount exceeding the value as the person moving on the first lane.

7. The information processing device according to claim 5, wherein the at least one processor is configured to execute the instructions to determine whether to initiate a collation process on a basis of whether or not the recognized person is on the first lane.

8. The information processing device according to claim 5, wherein the at least one processor is configured to execute the instructions to determine a priority order for a collation process on the basis of the feature amount of the person moving on the first lane and the feature amount of the person moving on the second lane.

9. A non-transitory computer-readable medium storing a program executable by a computer to:

acquire a captured image of a pre-passage side area of a first gate corresponding to a first lane, the captured image including at least a part of a pre-passage side area of a second gate corresponding to a second lane adjacent to the first lane;

detect a feature amount of a person moving on the first lane and a feature amount of a person moving on the second lane from the captured image; and recognize the person moving on the first lane on a basis of the feature amount of the person moving on the first lane and the feature amount of the person moving on the second lane, the person moving on the first lane and the person moving on the second lane located in an end area in a horizontal direction in the captured image.

10. The non-transitory computer-readable medium according to claim 9, wherein the program is executable by the computer to in a case where the feature amount of the person moving on the first lane or the feature amount of the person moving on the second lane exceeds a value set to the end area, recognize the person having the feature amount exceeding the value as the person moving on the first lane.

11. The non-transitory computer-readable medium according to claim 9, wherein the program is executable by the computer to determine whether to initiate a collation process on a basis of whether or not the recognized person is on the first lane.

12. The non-transitory computer-readable medium according to claim 9, wherein the program is executable by the computer to determine a priority order for a collation process on the basis of the feature amount of the person moving on the first lane and the feature amount of the person moving on the second lane.

* * * * *